United States Patent
Brockerhoff et al.

(10) Patent No.: US 9,283,864 B2
(45) Date of Patent: Mar. 15, 2016

(54) CIRCUIT, ELECTRIC POWER TRAIN AND METHOD FOR CHARGING A BATTERY

(71) Applicant: Infineon Technologies AG, Neubiberg (DE)

(72) Inventors: Philip Georg Brockerhoff, Munich (DE); Anton Mauder, Kolbermoor (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 63 days.

(21) Appl. No.: 14/185,982

(22) Filed: Feb. 21, 2014

(65) Prior Publication Data

US 2015/0239363 A1    Aug. 27, 2015

(51) Int. Cl.
*B60L 9/00* (2006.01)
*B60L 11/18* (2006.01)
*H02J 7/00* (2006.01)

(52) U.S. Cl.
CPC ......... *B60L 11/1848* (2013.01); *B60L 11/1805* (2013.01); *H02J 7/008* (2013.01); *H02J 7/0029* (2013.01); *H02J 7/0091* (2013.01); *H02J 2007/0037* (2013.01); *Y10S 903/907* (2013.01)

(58) Field of Classification Search
CPC ..................................... H02P 7/00; H02P 4/00
USPC ............. 701/22; 320/160, 152, 137, 134, 164
See application file for complete search history.

(56) References Cited

U.S. PATENT DOCUMENTS

2011/0149611 A1* 6/2011 Moussaoui et al. ........ 363/21.04
2012/0249124 A1* 10/2012 Ionescu ....................... 324/207.2
2013/0049654 A1* 2/2013 Kure ........................... 318/400.2

* cited by examiner

*Primary Examiner* — Luke Huynh

(57) ABSTRACT

A circuit is provided, including a battery, an omnipolar switch, a switching element, a DC-intermediate circuit and a current supplying circuit. The omnipolar switch may be coupled to the battery and may be configured to electrically disconnect the battery. The DC-intermediate circuit may be coupled to the omnipolar switch via the switching element, and the current supplying device may be coupled to the DC-intermediate circuit.

18 Claims, 5 Drawing Sheets

FIG 10

1000 — Coupling and decoupling a battery to a current supplying device via a switching element having a maximum blocking voltage that is less than a maximum voltage of the current supplying device and larger than a difference of a maximum voltage of the current supplying device and a minimum voltage of the battery

CIRCUIT, ELECTRIC POWER TRAIN AND METHOD FOR CHARGING A BATTERY

TECHNICAL FIELD

Various embodiments relate generally to circuits and electric power trains of electric vehicles and methods for charging batteries of electric vehicles.

BACKGROUND

Electric vehicles may have a battery and an electric drive unit for propulsion. The motor of the electric drive unit may be used as a regenerative brake; that is, it may be used as a generator to convert kinetic energy into electrical energy. It is desired to use the electrical energy provided by the electric drive unit to charge the battery.

However, in case of failure at high speeds of the electric vehicle and especially when the battery is nearly empty, large currents may flow into the battery. This may lead to large braking torques on one or more wheels of the electric vehicle which may lead to dangerous situations on slippery roads or in curves. Further, charging the battery with too high current may result in a fire or damage or destroy the battery, especially when the battery is already fully charged, too hot or too cold.

To prevent an uncontrolled charge of the battery, the maximum voltage of the motor may be chosen to be smaller than a minimum voltage of the battery. However, a larger current that is required in this case to provide the same power level may lead to heavier motors and larger control electronics for the electric motor, which may increase cost, space requirements and weight and reduce the electrical efficiency of the electric drive unit.

SUMMARY

A circuit is provided, including a battery, an omnipolar switch, a switching element, a DC-intermediate circuit and a current supplying device. The omnipolar switch may be coupled to the battery and may be configured to electrically disconnect (or electrically isolate) the battery. The DC-intermediate circuit may be coupled to the omnipolar switch via the switching element, and the current supplying device may be coupled to the DC-intermediate circuit.

In various embodiments, the switching element may have a maximum blocking voltage that is less than a maximum voltage of the current supplying device and more than a difference of the maximum voltage of the current supplying device and a minimum voltage of the battery.

In various embodiments, the switching element may have a maximum blocking voltage that is less than a difference of a maximum voltage of the current supplying device and a minimum voltage of the battery.

In various embodiments, the switching element may include a plurality of switches coupled in series to each other. Each switch may have a maximum blocking voltage and a sum of the maximum blocking voltages of the plurality of switches may be less than the maximum voltage of the current supplying device and more than a difference of a maximum voltage of the current supplying device and a minimum voltage of the battery.

In various embodiments, the switching element may further include at least one other switch coupled in series with the plurality of switches. A sum of the maximum blocking voltages of the plurality of switches and a maximum blocking voltage of the at least one other switch may be greater than the maximum voltage of the current supplying device.

In various embodiments, each switch of the plurality of switches and the at least one other switch may have the same maximum blocking voltage.

In various embodiments, at least one switch of the plurality of switches may be coupled between a positive pole of the battery and the current supplying device and at least one switch of the plurality of switches may be coupled between a negative pole of the battery and the current supplying device.

In various embodiments, the circuit may further include a diode coupled in parallel to the switching element and configured to allow a current flow from the battery to the current supplying device and to block a current flow from the current supplying device to the battery.

In various embodiments, the circuit may further include a snubber circuit coupled to the switching element.

In various embodiments, the circuit may further include a control unit configured to operate the switching element depending on at least one of the following: a voltage difference between a voltage of the current supplying device and a voltage of the battery exceeding a voltage threshold; a current flowing from the current supplying device to the battery exceeding a current threshold; and a temperature exceeding a temperature threshold.

In various embodiments, the current supplying device may include one of the following: an electric drive unit; and a charger.

In various embodiments, the electric drive unit may include a permanently excited synchronous motor; and an inverter with freewheeling diodes coupled to the permanently excited synchronous motor.

Further, an electric power train is provided, the electric power train including a traction battery, an electric drive unit and a switching element. The electric drive unit may include an inverter and a permanently excited synchronous motor coupled to the inverter. The inverter may be coupled to the traction battery and the switching element may be coupled between the traction battery and the drive unit. The maximum voltage of the drive unit may be greater than a minimum voltage of the battery.

In various embodiments, the switching element may have a maximum blocking voltage that is less than a maximum voltage of the drive unit.

In various embodiments, the switching element may have a maximum blocking voltage that is less than a difference of the maximum voltage of the drive unit and a minimum voltage of the traction battery.

Still further, a method for charging a battery is provided. The method may include coupling and decoupling the battery to a current supplying device via a switching element, wherein the switching element has a maximum blocking voltage that is: less than a maximum voltage of the current supplying device; and larger than a difference of a maximum voltage of the current supplying device and a minimum voltage of the battery.

In various embodiments, the switching element may couple the current supplying device to the battery when a voltage difference between a voltage of the current supplying device and a voltage of the battery is below a first threshold.

In various embodiments, the switching element may decouple the current supplying device from the battery when at least one of: a voltage difference between a voltage of the current supplying device and a voltage of the battery exceeds a second threshold; a current flowing from the current supplying device to the battery exceeds a current threshold; and a temperature exceeds a temperature threshold.

In various embodiments, the switching element may intermittently couple the current supplying device to the battery after it has been decoupled from the current supplying device battery while the voltage difference between the voltage of the current supplying device and the voltage of the battery exceeds the second threshold.

In various embodiments, the current of the current supplying device may be provided by a charger or an electric drive unit operated as a generator.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the drawings, the left-most digit(s) of a reference number may identify the drawing in which the reference number first appears. The same numbers may be used throughout the drawings to reference like features and components. In the following description, various embodiments of the invention are described with reference to the following drawings, in which:

FIG. 10 shows an embodiment of a method for charging a battery.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
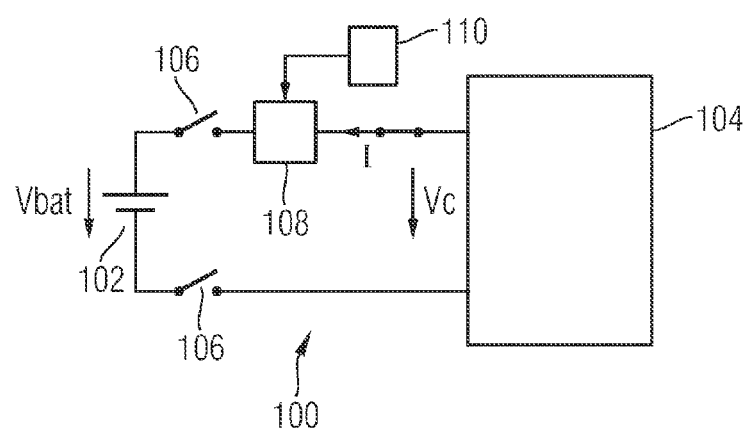
FIG. 1 shows an embodiment of a circuit.

FIG. 1 shows an embodiment 100 of a circuit, for example for an electric power train. The electric power train may include a battery 102 and an electric drive unit 104. The battery 102 may power the electric drive unit 104 in order to propel an electric vehicle. It may be a traction battery, that is, a rechargeable battery used for the propulsion of electric vehicles. It may be a lead acid battery, a nickel metal hydride battery, a lithium ion battery, a molten salt battery, or any other kind of battery. The battery voltage Vbat may for example be Vbat=150 V to 500 V, however, other values are possible.

The battery 102 may be coupled to the electric drive 104 via an omnipolar switch 106 and a protection unit 108. The omnipolar switch 106 may have a switch coupled to a positive pole (+) of the battery 102 and a switch coupled to a negative pole (−) of the battery 102. It serves to separate or disconnect the positive pole (+) and the negative pole (−) of the battery 102 from the drive unit 104, for example when the electric vehicle is parked or during emergency situations. The omnipolar switch 106 may be a relay and/or a semiconductor switch.

The electric drive 104 may charge the battery 102 during regenerative breaking and may provide a voltage Vc. The protection unit 108 may connect and disconnect the battery 102 from the electric drive unit 104. As an example, for an electric drive unit 104 with a power of 85 kW and a battery voltage Vbat=250 V, the protection unit 108 may need to switch a current of 340 A. As an example, if the maximal dissipation of the protection unit 108 is 500 W, the protection unit 108 may have an on-state resistance of 4.3 mΩ or a voltage drop of 1.5 V.

A control unit 110 may operate the protection unit 108. While the battery 102 is powering the electric drive unit, the control unit 110 may operate the protection unit 108 to connect the battery 102 to the electric drive unit 104. The control unit 110 may disconnect the battery 102 from the electric drive unit 104 when a voltage difference Vc−Vbat between the voltage Vc of the electric drive unit 104 and the voltage Vbat of the battery 102 exceeds a voltage threshold, or if a current flowing from the electric drive unit 104 to the battery 102 exceeds a current threshold, or if a temperature, for example of the battery 102 or the drive unit 104, exceeds a temperature threshold, or during any such event that is likely to damage any part of the electric power train. Such safety relevant events are likely to occur when the electric vehicle is moving at a high speed and the battery 102 nearly fully discharged or when the battery 102 is being charged when it is already fully charged. The control unit 110 may also disconnect the battery 102 from the electric drive unit 104 when an interlock signal is active. An interlock signal may indicate that a case or housing has been opened and that parts carrying a high voltage may be exposed to human contact.

After the event has subsided and/or after a reset signal has been issued, the control unit 110 may operate the protection unit 108 to connect the battery 102 to the electric drive unit 104. The protection unit 108 may therefore control the charging of the battery 102 by the electric drive unit 104 and may so protect the battery 102. The maximum voltage Vcmax of the drive unit 104 may therefore be greater than the minimum voltage Vbatmin of the battery 102 without introducing safety risks. Consequently, smaller electronic motors and control electronics (for example in an inverter) may be used, which may decrease cost, space requirements and weight and increase the efficiency of the electric drive unit.

Instead of an electric drive unit 104, any current supplying device may be used. For example, a charger connected to a mains supply may be coupled to the battery in order to charge it. The protection unit 108 may disconnect the battery 102 from the charger to prevent an overcharge of the battery. In other words, the protection unit 108 may disconnect the battery 102 from the charger e.g. in case of a failure of the charger or the failure of a or missing data connection between the battery 102 and the charger.

Figure 2:
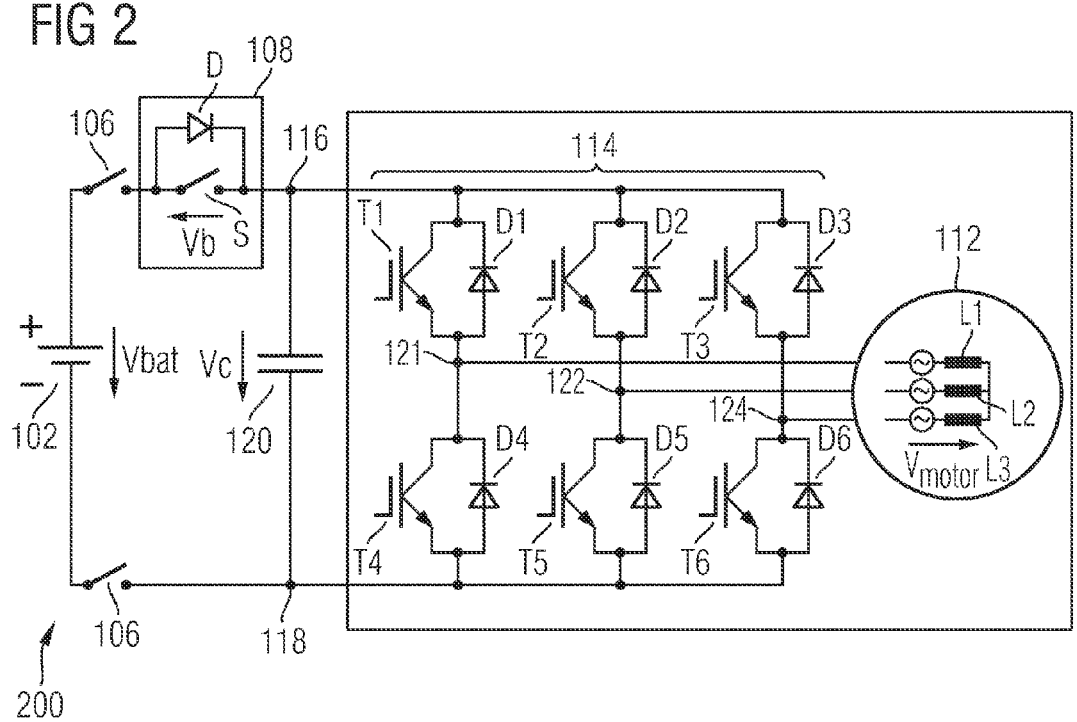
FIG. 2 shows embodiments of an electric power train.

FIG. 2 shows an embodiment 200 of an electric power train. FIG. 2 may describe the electric power train of FIG. 1 in more detail, so that the description given in conjunction with FIG. 1 may also apply to FIG. 2 and vice versa. To simplify illustration, the control unit 110 is not shown in FIG. 2; however, it may be present in embodiment 200.

The battery 102 is again coupled to the electric drive unit 104 via the omnipolar switch 106 and the protection unit 108. The electric drive unit 104 may include an inverter (or power inverter) 114 and an electric motor 112.

The inverter 114 may be powered by direct current (DC). It may be a B6 bridge. The inverter 114 may have three switches T1, T2 and T3, which may each have a first terminal connected to a positive node 116 and a second terminal connected to a respective coil node 121, 122, and 124. It may have three further switches T4, T5 and T6, which may each have a first terminal connected to a negative node 118 and a second terminal connected to one of the respective coil nodes 121, 122, and 124. The inverter 114 may power coils in the electric motor 112 in order to obtain a rotating magnetic field in the electric motor 112.

The electric motor 112 may be a brushless DC motor (BLDC). It may be permanently excited synchronous motor. Each of the coil nodes 121, 122, and 124 of the inverter 114 may be connected to a respective motor phase of the electric motor 112. The motor phases may be represented by a voltage source and one of the coils L1, L2, and L3. The coils L1, L2, and L3 may be arranged at 120 degrees to each other in a stator of the electric motor 112. A rotating magnetic field about an axis of the motor 112 may be obtained by driving the three coils L1, L2, and L3 with currents lagging each other by 120 degrees. In FIG. 2 the coils L1, L2 and L3 are shown in a star- or Y-connection having one common node. But this is only an example, since they could also be connected in a delta-connection with the common node between each two of the coils being connected to one of the terminals of the inverter. Control circuit for operating switches T1, T2, T3, T4, T5, and T6 to drive the coils L1, L2, and L3 are known in the art and will not be described in detail here. The rotor of the motor 112 may have a constant magnetic field, for example generated by a permanent magnet. The north pole of the rotor will move toward the south pole of the rotating magnetic field of the stator, and vice versa. The number of coils in the motor may also be higher than the three coils shown in the example of FIG. 1. When using e. g. s=4, 5, 6 or more coils, an equal number of pair of operating switches can be used to provide a current lagging of 360°/s between the currents through each two adjoining coils.

The switches T1, T2, T3, T4, T5 and T6 may be power transistors, such as power metal oxide semiconductor field effect transistors (MOSFET) or insulated gate bipolar transistors (IGBT). Each of the switches T1, T2, T3, T4, T5 and T6 may not be able to conduct a reverse current, that is, a current flowing from its second node (or the respective coil node 121, 122, and 124) to its first terminal.

In order to allow a current to flow from the electric motor 112 through the inverter 114 to the battery 102, each of the switches T1, T2, T3, T4, T5, and T6 may have a respective diode D1, D2, D3, D4, D5, and D6 connected across its first terminal and its second terminal, where the diodes D1, D2, D3, D4, D5, and D6 are configured so that current may flow from the respective second terminal to the respective first terminal. The diodes D1, D2, D3, D4, D5, and D6 may be the respective body diodes of the switches T1, T2, T3, T4, T5, and T6 if MOSFETs are used for the switches T1, T2, T3, T4, T5, and T6. The diodes D1, D2, D3, D4, D5, and D6 may be so called free-wheeling diodes. They may rectify the alternating currents provided by the coils L1, L2, and L3 when the electric motor 112 is used as a regenerative brake into direct current.

An intermediate circuit 120, for example a DC-link circuit, including a capacitor or any other kind of energy storage, may be used to couple the different voltages and currents of the electric drive unit 104 and the battery 102. It may be coupled between the positive node 116 and the negative node 118. The intermediate circuit 120 may smoothen the rectified alternating currents provided by the inverter 114 during regenerative braking.

The protection unit 108 may have a switching element S and a diode D. The switching element S may be a MOSFET or an IGBT. It may have a maximum blocking voltage Vbmax that is less than a maximum voltage of the drive unit 104 or the current supplying device. A maximum blocking voltage may be the maximum voltage that a device will reliably withstand without breakdown when in the "off" state, that is, when it is not conducting. In other words, the switching element S may start to conduct if the voltage exceeds the maximum blocking voltage Vbmax. The maximum voltage of the drive unit 104 Vcmax may be the maximum voltage that may be generated when the motor is used for regenerative braking. A maximum blocking voltage Vbmax that is less than a maximum voltage Vcmax of the drive unit 104 may be enough if the battery voltage Vbat is not equal to zero since the switching element S only needs to withstand a voltage that is larger than the difference of the voltage Vc of the drive unit 104 and the voltage Vbat of the battery 102. For a drive unit 104 supplying a maximum voltage of Vcmax=550 V, the switching element S may have a maximum blocking voltage of Vbmax<Vcmax=550 V.

Many traction batteries are not discharged to 0 V; rather discharging is stopped at a minimum voltage Vbatmin of the battery 102. The minimum voltage Vbatmin of the battery 102 may be a percentage of the nominal rated voltage of the battery. For example, a battery with a nominal rated voltage of 300 V may have a minimum voltage at 80% of the nominal rated voltage, that is, Vbatmin=240 V.

The switching element S may have a maximum blocking voltage Vbmax that is larger than a difference of a maximum voltage Vcmax of the drive unit 104 (or current supplying device) and a minimum voltage Vbatmin of the battery 102. For a motor unit 104 supplying a maximum voltage of Vcmax=550V, the switching element S may have a maximum blocking voltage: Vbmax>Vcmax−Vbatmin=550 V−240 V=310 V. Therefore, Vbmax of the switching element S may be chosen to be:

$$V{cmax} - V{batmin} < V{bmax} < V{cmax} \qquad (1)$$

For the example given above, Vbmax may lie between 310 V<Vbmax<550 V.

However, in everyday operation of regenerative braking, the combination of the maximum voltage Vcmax being supplied by the drive unit 104 (or current supplying device) and the battery 102 having a minimum voltage Vbatmin may be very rare as it implies an electric vehicle moving at high speed with an empty battery. The switching element S may therefore have a maximum blocking voltage Vbmax that is smaller than a difference of a maximum voltage Vcmax of the drive unit 104 and a minimum voltage Vbatmin of the battery 102, that is:

$$V{bmax} < V{cmax} < V{batmin}.$$

Vbmax may therefore be around or just below or just above or equal to Vcmax−Vbatmin. For the example given above, Vbmax may be around or just below or just above or equal to 310 V.

The area related on-state resistance of a MOSFET may be proportional approximately to $V_{bmax}^{2.5}$. If the maximum blocking voltage Vbmax can be reduced by a half, the area related on-state resistance will be reduced by a factor of 5.6. Reducing the maximum blocking voltage Vbmax reduces the area required for the switching element S and allows cheaper MOSFETs to be used.

The diode D may be coupled in parallel to the switching element S and may allow a current flow from the battery 102 to the drive unit 104 (or current supplying device) and may block a current flow from the drive unit 104 (or current supplying device) to the battery 102. The diode D is optional and may automatically maintain a current flow from the battery 102 to the intermediate circuit 120 when the battery voltage Vbat is dropping. The diode D may have the same or larger maximum blocking voltage Vbmax as the switching element S. In order to reduce conduction losses in the diode D, the switching element S may be closed when the diode D conducts. The diode D may be monolithically integrated in the switching element S when the switching element S is a semiconductor switch, e.g. one of a reverse conducting IGBT or a power MOSFET.

Again, instead of the electric drive unit 104, any current supplying device may be used. For example, a charger may be coupled to the battery 102 in order to charge it. The intermediate circuit 120 may be used by the charger to further smoothen the charging current which may reduce stress on the battery during charging. The protection circuits of chargers may need to be bi-directionally blocking, that is, they have to able to prevent current flowing through them from both directions. If the protection circuit 108 is present, uni-directional protection circuits may be used for the chargers, which may lead to lower losses in the switching elements of the protection circuits. This may further lead to smaller and therefore cheaper switching elements in the protection circuits of the charger. As another example, the electric drive unit 104 may be an electric DC motor with brushes. The protection unit 108 may disconnect the battery 102 from the current supplying device to prevent an overcharge of the battery 102.

Figure 3:
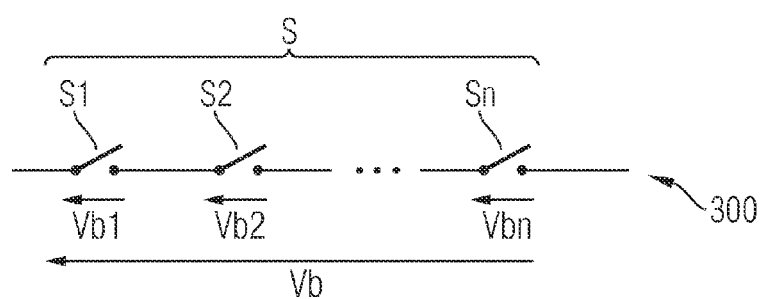
FIG. 3 shows an embodiment of a switching element.

FIG. 3 shows an embodiment 300 of a switching element S of the protection unit 108. The switching element S may include a plurality of switches S1, S2, ..., Sn, which may be coupled in series to each other. The switches S1, S2, ..., Sn may be MOSFETs.

Each of the switches S1, S2, ..., Sn may have a respective maximum blocking voltage Vb1, Vb2, Vbn. The maximum blocking voltage Vb of the switching element S may be the same as the sum of the respective maximum blocking voltage Vb1, Vb2, ..., Vbn:

$$Vb1+Vb2+\ldots+Vbn=Vb. \quad (2)$$

As each respective maximum blocking voltage Vb1, Vb2, ..., Vbn may be smaller than the maximum blocking voltage Vb of a single switch, the total area related on-state resistance, that is, the sum of the area related on-state resistance of the switches S1, S2, ..., Sn, may be reduced so that cheaper MOSFETs may be used.

The plurality of switches S1, S2, ..., Sn may each have the same maximum blocking voltage:

$$Vb1=Vb2=\ldots=Vbn \quad (3).$$

For the case that Vb1=Vb2=...=Vbn=Vb/n, the total area related on-state resistance of the n series connected switches S1, S2, ..., Sn may then be proportional to $$n\cdot(Vb/n)^{2.5}=Vb^{2.5}/n^{1.5} \quad (4)$$

which less than $Vb^{2.5}$ for n greater than 1.

To simplify illustration, the control unit 110 is not shown in FIG. 2. However, the control unit 110 would operate all of the switches S1, ..., S2, Sn at the same time in the same direction. For example, the control unit 110 may open or closed all the switches S1, S2, ..., Sn at the same time.

The number n of the switches S1, ..., S2, Sn and their respective maximum blocking voltage Vb1, Vb2, ..., Vbn may be chosen so that the sum of the maximum blocking voltages of the switches S1, S2, ..., Sn is less than the maximum voltage of the drive unit (or current supplying device) 104:

$$Vb1+Vb2+\ldots+Vbn<Vcmax. \quad (5)$$

The number n of the switches S1, S2, ..., Sn and their respective maximum blocking voltage Vb1, Vb2, ..., Vbn may also be chosen so that the sum of the maximum blocking voltages Vb1, Vb2, ..., Vbn of the switches S1, S2, ..., Sn is more than a difference of a maximum voltage of the drive unit (or the current supplying device) 104 and a minimum voltage of the battery:

$$Vb1+Vb2+\ldots+Vbn>Vcmax-Vbatmin \quad (6)$$

However, the number n of the switches S1, S2, ..., Sn and their respective maximum blocking voltage Vb1, Vb2, ..., Vbn may also be chosen so that the sum of the maximum blocking voltages Vb1, Vb2, ..., Vbn of the switches S1, S2, ..., Sn is less than a difference of a maximum voltage of the drive unit 104 (or current supplying device) and a minimum voltage of the battery:

$$Vb1+Vb2+\ldots+Vbn<Vcmax-Vbatmin \quad (7)$$

Figure 4:
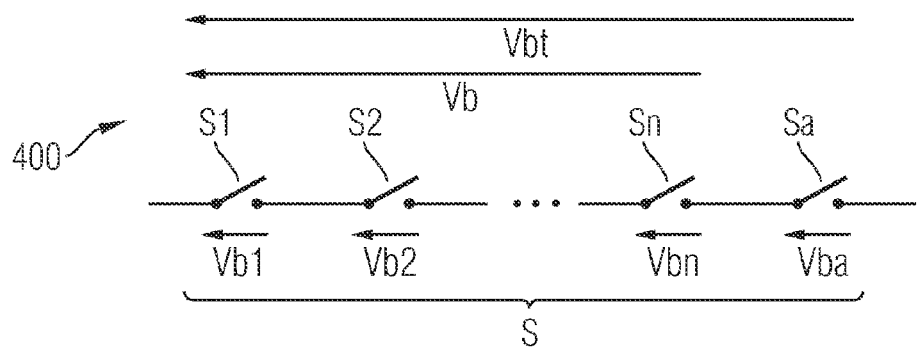
FIG. 4 shows another embodiment of a switching element.

FIG. 4 shows an embodiment 400 of a switching element S of a protection unit 108. The switching element S may be the same as in FIG. 3 so that the description of embodiment 300 may apply to embodiment 400. However, embodiment 400 may further include at least one other switch Sa coupled in series with the plurality of n switches S1, S2, ..., Sn. The at least one other switch Sa may be a MOSFET.

The at least one other switch Sa (only one switch Sa is shown) may have a maximum blocking voltages Vba. A sum of the maximum blocking voltages Vb, Vb2, ..., Vbn of the plurality of switches S1, S2, ..., Sn may be greater than the difference of the maximum voltage Vcmax of the drive unit 104 (or current supplying device) and the minimum voltage Vbatmin of the battery 102:

$$Vb1+Vb2+\ldots+Vbn>Vcmax-Vbatmin. \quad (8)$$

Again, the sum of the maximum blocking voltages Vb1, Vb2, ..., Vbn may be chosen to be about or equal or a little smaller than Vcmax−Vbatmin, as described above. In this case, the total maximum blocking voltage Vbt of the series connection will be larger than Vcmax−Vbatmin:

$$Vbt=Vb1+Vb2+\ldots+Vbn+Vba>Vcmax-Vbatmin.$$

The purpose of the at least one other switch Sa is to provide additional safety in case one of the plurality of switches S1, S2, ..., Sn fails, that is, if it becomes conductive and cannot be opened to interrupt the current flowing. In this case, the remaining switches, that is the ones that can still be opened to interrupt current flowing through them, and the at least one another switch Sa will still have a total maximum blocking voltage that is large enough to interrupt a current flow. The plurality of switches S1, S2, ..., Sn and the at least one other switch Sa may have the same maximum blocking voltage Vb $$Vb1=Vb2=\ldots=Vbn=Vba \quad (9)$$

According to a further embodiment, the other switch Sa is used to ease control over the chain of switches S1, S2, ..., Sn. The switches S1, S2, ..., Sn may be controlled in a way that if the lower switch, e. g. Sx+1, in the chain is in a conducting mode, the switch Sx itself will be or will be rendered in a conducting mode, too, and when the lower switch Sx+1 is in a blocking mode, the switch Sx will be or will be rendered into a blocking mode, too. Permitted values of x are between 1 and n−1. The switch Sn thus is controlled directly by the state of the other switch Sa.

To simplify illustration, the control unit 110 is not shown in FIG. 4. However, the control unit 110 would operate all of the switches S1, S2, . . . , Sn and Sa at the same time and in the same direction. For example, the control unit 110 may open or closed all the switches S1, S2, . . . , Sn and an the at least one other switch Sa at the same time.

A diode D may be coupled to the series connection of switches shown in FIG. 3 and FIG. 4. The diode D may allow a current flow from the battery 102 to the drive unit 104 (or current supplying device) and may block a current flow from the drive unit 104 (or current supplying device) to the battery 102. The diode D may have the same or larger maximum blocking voltage Vbmax as the series connection of the switches. According to an embodiment, the diode D may be monolithically integrated in the single switching elements S1, S2, . . . , Sn when the single switching elements S1, S2, . . . , Sn are semiconductor switches, e.g. one of a reverse conducting IGBT or a power MOSFET.

The protection unit 108 shown in FIG. 2 may be coupled between the switch of the omnipolar switch 106 that is connected to the positive pole (+) of the battery 102 and the positive node 116 (or the drive circuit 104). However, the protection unit 108 may also be coupled between the switch of the omnipolar switch 106 that is connected to the negative pole (−) of the battery 102 and the negative node 118 (or the drive circuit 104).

Figure 5:
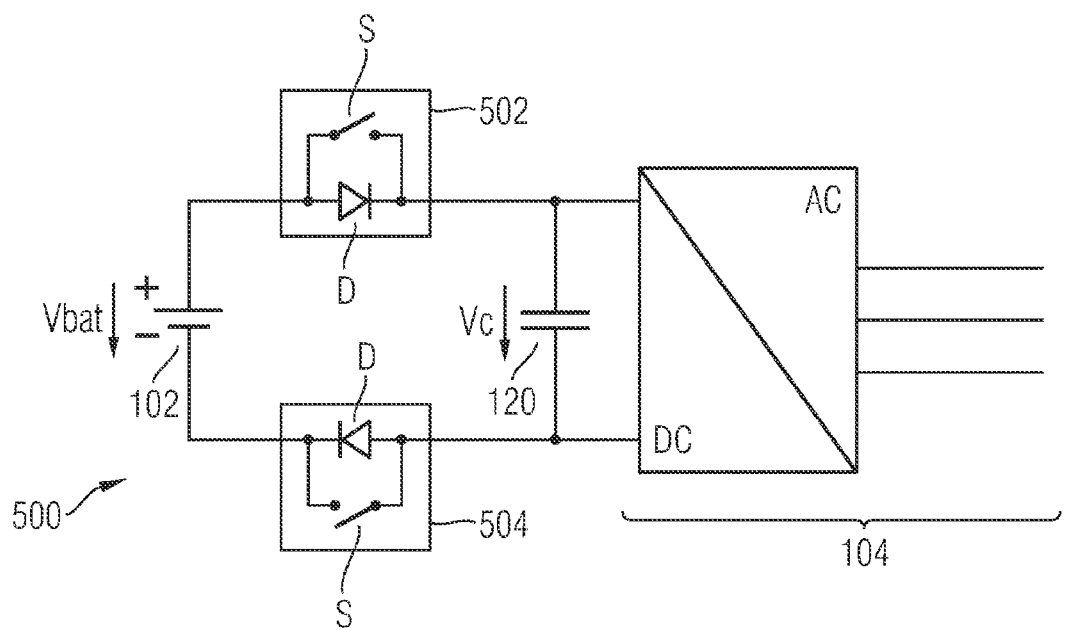
FIG. 5 shows still another embodiment of a switching element.

FIG. 5 shows an embodiment 500 with a first protection unit 502 and a second protection unit 504. The first protection unit 502 and the second protection unit 504 may be the same as the protection unit 108 described in conjunction with FIGS. 1 to 4 and may have the same switching elements S. The first protection unit 502 may be coupled between the positive pole (+) of the battery 102 and the positive node 116 (or the drive unit or the current supplying device 104). The second protection unit 504 may be coupled between the negative pole (−) of the battery 102 and the negative node 118 (or the drive unit or the current supplying device 104). The first protection unit 502 and the second protection unit 504 may be used in the embodiments 100 and 200 instead of the protection unit 108. To simplify illustration, the omnipolar switch 106 and the control unit 110 are not shown in FIG. 5.

The blocking voltage needed for the difference of the voltage Vc of the drive unit 104 (or current supplying device) and the voltage Vb of the battery 102 may be shared between the first protection unit 502 and the second protection unit 504. The maximum blocking voltage required for the first protection unit 502 and the second protection unit 504 may be halved if they are constructed similarly, for example, if they have the same switching elements S. If there is an even number of switches S1, S2, . . . , and Sn in the plurality of switches, one half of the switches may be connected in series as part of the first protection unit 502 and the other half may be connected in series as part of the second protection unit 504. For the example given above, Vbmax may lie between 155 V<Vbmax<275 V for each of the protection units 502, 504 instead of 310 V<Vbmax<550 V. As the area related on-state resistance of MOSFETs are proportional to $Vbmax^{2.5}$, the area required for the switching elements S may be further reduced and cheaper MOSFETs may be used.

Figure 6:
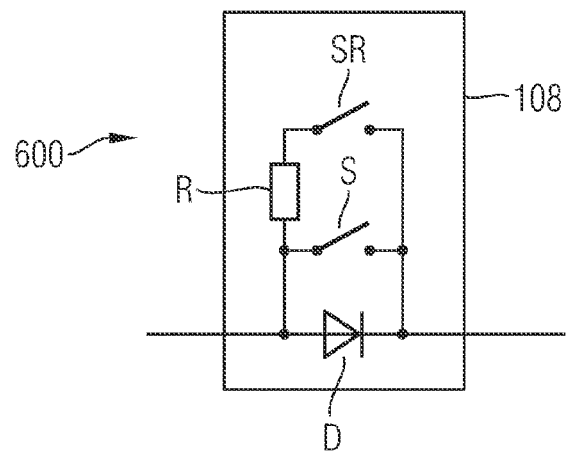
FIG. 6 shows an embodiment of a protection unit.

FIG. 6 shows an embodiment 600 of a protection unit 108. In addition to the protection unit 108 described in conjunction with embodiment 200, the protection unit 108 may have a resistor R and a switch SR coupled in series with the resistor. The series connection of the resistor R and the switch SR may be coupled in parallel to the switching element S. Switch SR may be closed to dissipate energy provided by the drive unit 104 (or the current supplying device). This may be useful if the inductivities Lbat and Lcable are too small for inducing voltages necessary for a pulsed charging of the battery 102, which is described below.

The switch SR and the resistor R may also be used to reduce the voltage difference Vc−Vbat between the DC-intermediate circuit 120 and the battery 102 before the switching element S is closed. If the voltage difference is too large, closing the switching element S may lead to peak (or surge) currents and overvoltages.

Figure 7:
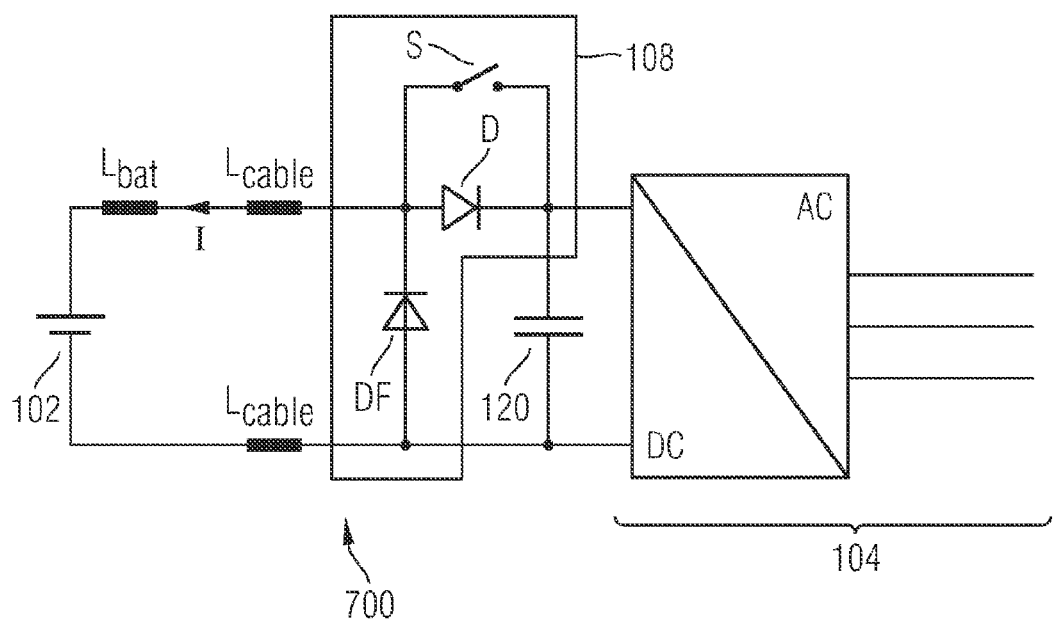
FIG. 7 shows an embodiment of a circuit with a freewheeling diode.
Figure 8:
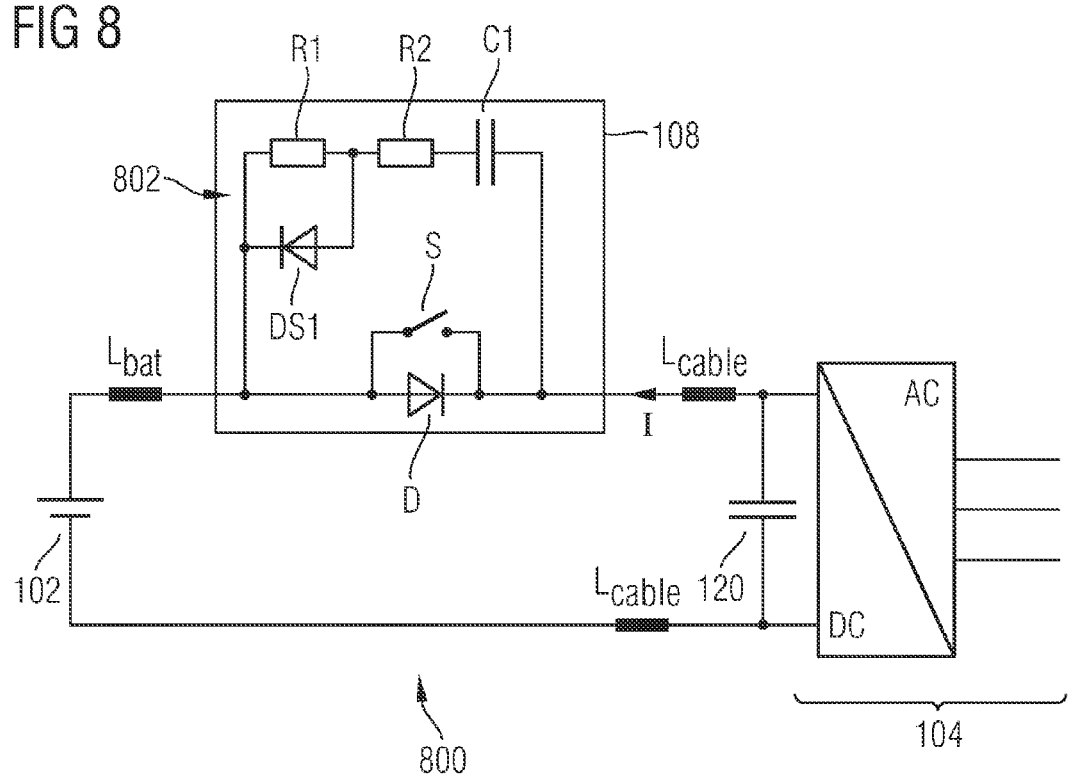
FIG. 8 shows an embodiment of a circuit with a snubber circuit.
Figure 9:
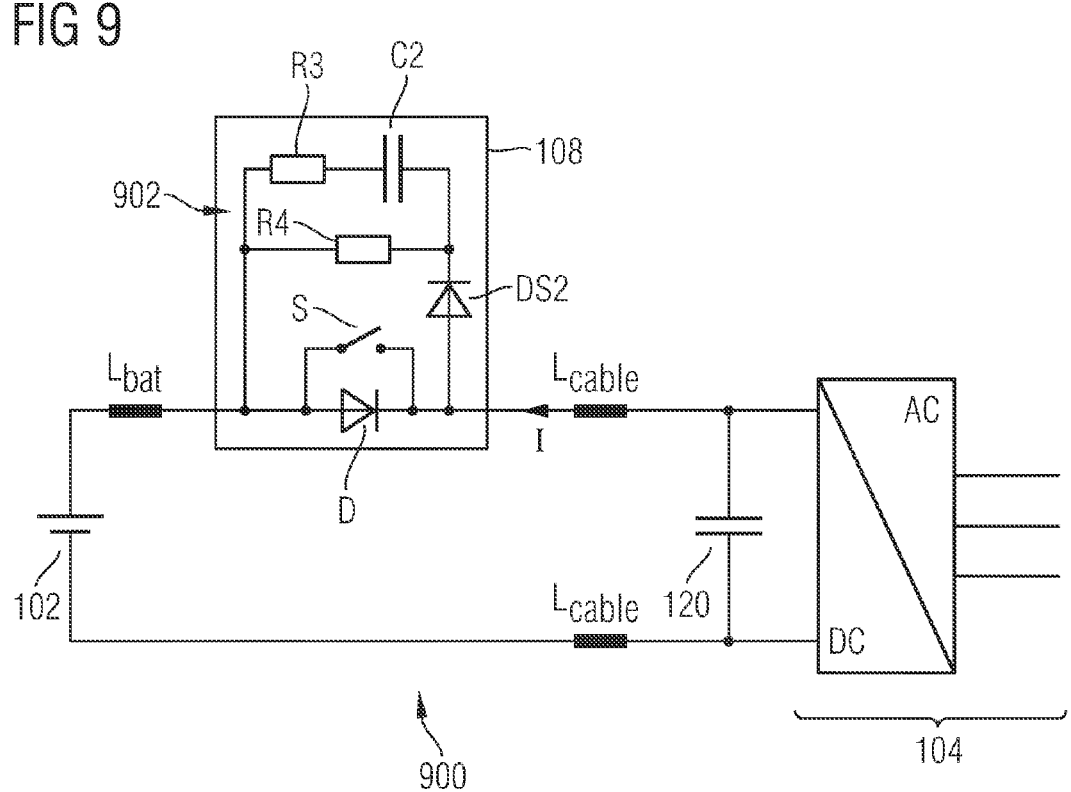
FIG. 9 shows an embodiment of a circuit with another snubber circuit.

The wiring (or cables) between the battery 102 and the DC-intermediate circuit 120 and the battery 102 may have inductivities, which may be represented by the inductivities Lcable and Lbat, respectively, see for example FIGS. 7 to 9. If the current flow from the DC-intermediate circuit 120 to the battery 102 is stopped suddenly, a voltage may be induced in the inductivities Lcable and Lbat. This voltage may cause an avalanche breakdown in the switching element S, which may lead to additional power losses. In order to avoid an avalanche breakdown, the inductivities Lcable and Lbat may be reduced.

FIG. 7 shows an embodiment 700 of a circuit with a freewheeling diode DF. The freewheeling diode DF may be coupled across the series connection of the inductivities Lcable and Lbat and the battery 102 in an anti-parallel manner to the polarity of the battery 102. The freewheeling diode DF may protect the switching element S from the voltage induced in the inductivities Lcable and Lbat when the switching element S is opened suddenly. A current I flowing from the drive unit 104 through the switching element S to the battery 102 may continue to flow via the freewheeling diode DF when the switching element S is opened. The voltage induced in the inductivities Lcable and Lbat due to the rate of change in current may therefore be reduced and the likelihood of an avalanche breakdown in the switching element S may be minimized. The capacitor of the DC-intermediate circuit 120 and the freewheeling diode DF may be integrated in the protection unit 108.

The circuit of embodiment 700 may be used to pulse energy from the DC-intermediate circuit 120 to the battery 102. The circuit may operate as a step-down converter (or buck converter) when the switching element S is repeatedly closed and opened. The amount of current flowing into the battery 102 when the voltage Vc of the intermediate circuit 120 (or the drive unit 104) is greater than the voltage Vbat of the battery 102 may thus be controlled while the safety of operation is assured.

FIG. 8 shows an embodiment 800 of a circuit with a snubber circuit 802. The snubber circuit 802 may provide an alternative to the switching element S entering avalanche mode or to using a freewheeling diode DF, as was described in conjunction with FIG. 7. It reduces the voltage induced in the inductivities Lcable and Lbat after the switching element S is opened suddenly. The snubber circuit 802 may include a parallel connection of a resistor R1 and a diode DS1 that is connected in series with a capacitor C1 and a resistor R2. The snubber circuit 802 may be coupled across the switching element S and across the diode D. Diode DS1 may be connected so as to allow a current flow from the intermediate circuit 120 to the battery 102.

When the switching element S is opened, current I may continue to flow through capacitor C1. Resistor R2, which is in series with capacitor C1, may limit the charging current of capacitor C1. Resistor R1, which is in parallel with diode DS1, may limit the charging current of capacitor C1 when the switching element S is closed. The snubber circuit 802 may store the energy stored in the inductivities Lcable and Lbat and dissipate it in its resistances R1, and R2.

FIG. 9 shows an embodiment 900 of a circuit with another snubber circuit 902. It may again reduce the voltage induced in the inductivities Lcable and Lbat after the switching element S is opened suddenly by storing the energy of the inductivities Lcable and Lbat in a capacitor and dissipate it later.

The snubber circuit 902 may include a series connection of a resistor R3 and a capacitor C1. A resistor R4 may be coupled in parallel to the series connection. A diode DS2 may be coupled in series to the parallel connection. Diode DS2 may be connected so as to allow a current flow from the intermediate circuit 120 to the battery 102. The snubber circuit 902 may be coupled across the switching element S and across the diode D.

When the switching element S is opened, current I may continue to flow through the diode DS2 and the parallel connection. Capacitor C2 may be charged and resistor R3, which is in series with the capacitor C2, may limit the charging current of capacitor C2. Resistor R4 may provide a bypass to capacitor C2. Capacitor C2 may be discharged by resistor R4 when the switching element S is closed. Diode DS2 prevents a current flow into the rest of the circuit.

FIG. 10 shows an embodiment 1000 of a method for charging a battery. The method may include coupling and decoupling the battery to a current supplying device via a switching element that has a maximum blocking voltage that is less than a maximum voltage of the current supplying device and more than a difference of a maximum voltage of the current supplying device and a minimum voltage of the battery. Selecting the switching element with such a maximum blocking voltage may reduce the on-resistance and thus the size, volume, cost and of the switching element.

The method may include the switching element coupling the current supplying device to the battery when a voltage of the current supplying device is below a first threshold. In this way, energy may be supplied from the battery to the current supplying device and the current supplying device which may be an electric drive unit may be powered by the battery.

The method may include the switching element decoupling the current supplying device from the battery when at least one of: a voltage difference between a voltage of the current supplying device and a voltage of the battery exceeds a second threshold; a current flowing from the current supplying device to the battery exceeds a current threshold; and a temperature exceeds a temperature threshold. The temperature may, for example be the temperature of the battery or current supplying device (or the drive unit). In this way, an overcharging of the battery will be avoided.

The method may include the switching element intermittently coupling the current supplying device to the battery after it has been decoupled from the current supplying device battery while the voltage difference between the voltage of the current supplying device and the voltage of the battery continues to exceed the second threshold. The battery may thus be charged in a controlled manner while at the same time being protected from over-charging. Further, the braking torques on one or more wheels of the electric vehicle may be controlled.

The method may include the current of the current supplying device being provided by a charger or an electric drive unit operated as a generator.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit, comprising:
a battery;
an omnipolar switch coupled to the battery and configured to electrically disconnect the battery;
a DC-intermediate circuit coupled to the omnipolar switch via a switching element,
a current supplying device coupled to the DC-intermediate circuit; and
a control unit configured to operate the switching element depending on at least one of the following:
a voltage difference between a voltage of the current supplying device and
a voltage of the battery exceeding a voltage threshold;
a current flowing from the current supplying device to the battery exceeding a current threshold; and
a temperature exceeding a temperature threshold.

2. The circuit of claim 1, wherein
the switching element has a maximum blocking voltage that is less than a maximum voltage of the current supplying device and more than a difference of the maximum voltage of the current supplying device and a minimum voltage of the battery.

3. The circuit of claim 1, wherein
the switching element has a maximum blocking voltage that is less than a difference of a maximum voltage of the current supplying device and a minimum voltage of the battery.

4. The circuit of claim 1, wherein
the switching element comprises a plurality of switches coupled in series to each other, wherein
each switch has a maximum blocking voltage; and
a sum of the maximum blocking voltages of the plurality of switches is less than the maximum voltage of the current supplying device and more than a difference of a maximum voltage of the current supplying device and a minimum voltage of the battery.

5. The circuit of claim 4, wherein
the switching element further comprises at least one other switch coupled in series with the plurality of switches, wherein
a sum of the maximum blocking voltages of the plurality of switches and a maximum blocking voltage of the at least one other switch is greater than the maximum voltage of the current supplying device.

6. The circuit of claim 5, wherein
each switch of the plurality of switches and the at least one other switch have the same maximum blocking voltage.

7. The circuit of claim 4, wherein
at least one switch of the plurality of switches is coupled between a positive pole of the battery and the current supplying device; and
at least one switch of the plurality of switches is coupled between a negative pole of the battery and the current supplying device.

8. The circuit of claim 1, further comprising:
a diode coupled in parallel to the switching element and configured to allow a current flow from the battery to the current supplying device and to block a current flow from the current supplying device to the battery.

9. The circuit of claim 1, further comprising:
a snubber circuit coupled to the switching element.

10. The circuit of claim 1, wherein
the current supplying device comprises one of the following:
an electric drive unit; and
a charger.

11. The circuit of claim 10, wherein the electric drive unit comprises:
a permanently excited synchronous motor; and
an inverter with freewheeling diodes coupled to the permanently excited synchronous motor.

12. An electric power train, comprising:
a traction battery;
an electric drive unit comprising an inverter and a permanently excited synchronous motor coupled to the inverter, wherein the inverter is coupled to the traction battery; and
a switching element coupled between the traction battery and the drive unit, wherein
the maximum voltage of the drive unit is greater than a minimum voltage of the battery.

13. The electric power train of claim 12, wherein the switching element has a maximum blocking voltage that is less than a maximum voltage of the drive unit.

14. The electric power train of claim 12, wherein
the switching element has a maximum blocking voltage that is less than a difference of the maximum voltage of the drive unit and a minimum voltage of the traction battery.

15. A method for charging a battery, comprising:
coupling and decoupling the battery to a current supplying device via a switching element, wherein a current of the current supplying device is provided by charger or an electric drive unit operated as a generator; and
wherein the switching element has a maximum blocking voltage that is: less than a maximum voltage of the current supplying device; and
larger than a difference of a maximum voltage of the current supplying device and a minimum voltage of the battery.

16. The method of claim 15, wherein
the switching element couples the current supplying device to the battery when a voltage of the current supplying device is below a first threshold.

17. The method of claim 15, wherein
the switching element decouples the current supplying device from the battery when at least one of:
a voltage difference between a voltage of the current supplying device and a voltage of the battery exceeds a second threshold;
a current flowing from the current supplying device to the battery exceeds a current threshold; and
a temperature exceeds a temperature threshold.

18. The method of claim 17, wherein
the switching element intermittently couples the current supplying device to the battery after it has been decoupled from the current supplying device battery while the voltage difference between the voltage of the current supplying device and the voltage of the battery continues to exceed the second threshold.

* * * * *